United States Patent
Takesada et al.

(10) Patent No.: US 11,643,541 B2
(45) Date of Patent: May 9, 2023

(54) VINYL CHLORIDE-BASED RESIN COMPOSITION FOR POWDER MOLDING, AND VINYL CHLORIDE-BASED RESIN-MOLDED BODY AND LAMINATE

(71) Applicants: KANEKA CORPORATION, Osaka (JP); TATSUTA CHEMICAL CO., LTD., Ibaraki (JP)

(72) Inventors: Kentaro Takesada, Ibaraki (JP); Nobuyuki Shimizu, Ibaraki (JP)

(73) Assignees: KANEKA CORPORATION, Osaka (JP); TATSUTA CHEMICAL CO., LTD., Ibaraki (JP)

( * ) Notice: Subject to any disclaimer, the term of this patent is extended or adjusted under 35 U.S.C. 154(b) by 284 days.

(21) Appl. No.: 16/760,773

(22) PCT Filed: Aug. 21, 2018

(86) PCT No.: PCT/JP2018/030856
§ 371 (c)(1),
(2) Date: Apr. 30, 2020

(87) PCT Pub. No.: WO2019/087534
PCT Pub. Date: May 9, 2019

(65) Prior Publication Data
US 2021/0179833 A1   Jun. 17, 2021

(30) Foreign Application Priority Data
Nov. 2, 2017 (JP) .............................. JP2017-213003

(51) Int. Cl.
| | | |
|---|---|---|
| C08L 27/06 | (2006.01) | |
| B29C 64/153 | (2017.01) | |
| B32B 27/30 | (2006.01) | |
| B32B 27/40 | (2006.01) | |
| B29K 27/06 | (2006.01) | |
| C08K 5/521 | (2006.01) | |

(52) U.S. Cl.
CPC ............ *C08L 27/06* (2013.01); *B29C 64/153* (2017.08); *B32B 27/304* (2013.01); *B32B 27/40* (2013.01); *B29K 2027/06* (2013.01); *B32B 2605/00* (2013.01); *C08K 5/521* (2013.01); *C08L 2205/025* (2013.01)

(58) Field of Classification Search
CPC ....... C08L 27/06; B29C 64/153; B33Y 70/00; B32B 27/40; B32B 27/304
USPC ...................................................... 524/519
See application file for complete search history.

(56) References Cited

U.S. PATENT DOCUMENTS

| | | | |
|---|---|---|---|
| 2,989,496 A | | 6/1961 | Palm et al. |
| 5,677,356 A | * | 10/1997 | Shimizu ................. C08K 5/521 521/73 |
| 2010/0272984 A1 | | 10/2010 | Hada et al. |
| 2013/0075962 A1 | * | 3/2013 | Jigami .................... B29C 33/62 524/561 |
| 2015/0322244 A1 | | 11/2015 | Iwahori et al. |

FOREIGN PATENT DOCUMENTS

| | | |
|---|---|---|
| CN | 1126220 A | 7/1996 |
| CN | 101889054 A | 11/2010 |
| CN | 102933374 A | 2/2013 |
| EP | 0672709 A2 | 9/1995 |
| EP | 2 248 854 A1 | 11/2010 |
| EP | 2933292 A1 | 10/2015 |
| JP | H0379653 A | 4/1991 |
| JP | H0762181 A | 3/1995 |
| JP | H08157672 A | 6/1996 |
| JP | H08333495 A | 12/1996 |
| JP | H08333496 A | 12/1996 |
| JP | 2006052306 A | 2/2006 |
| JP | 2012007026 A | 1/2012 |
| JP | 2015067728 A | 4/2015 |
| JP | 2016-169318 A | 9/2016 |
| JP | 2017113898 A | 6/2017 |
| WO | 01/94460 A2 | 12/2001 |
| WO | 2014091867 A1 | 6/2014 |
| WO | 2016098344 A1 | 6/2016 |

OTHER PUBLICATIONS

International Search Report issued in corresponding International Application No. PCT/JP2018/030856; dated Nov. 27, 2018 (2 pages).
Written Opinion of the International Searching Authority issued in corresponding International Application No. PCT/JP2018/030856; dated Nov. 27, 2018 (4 pages).
Office Action issued in counterpart Chinese Patent Application No. CN201880071127.9 dated Oct. 29, 2021 (8 pages).
Extended European Search Report issued in corresponding European Patent Application No. 18872671.5 dated Apr. 23, 2021 (10 pages).

\* cited by examiner

*Primary Examiner* — Hui H Chin
(74) *Attorney, Agent, or Firm* — Osha Bergman Watanabe & Burton LLP

(57) ABSTRACT

A composition of polyvinyl chloride for powder molding may include a polyvinyl chloride (A), a polyvinyl chloride (B), and a phosphate, among others. The polyvinyl chloride (A) may have an average particle diameter of 50 to 500 μm, and the polyvinyl chloride (B) may have an average particle diameter of 0.01 μm or more and less than 50 μm. An average polymerization degree of the polyvinyl chloride (A) may be 1350 or more, and the phosphate may comprise a polyoxyalkylene alkyl phosphate.

20 Claims, No Drawings

VINYL CHLORIDE-BASED RESIN COMPOSITION FOR POWDER MOLDING, AND VINYL CHLORIDE-BASED RESIN-MOLDED BODY AND LAMINATE

TECHNICAL FIELD

The present invention relates to a polyvinyl chloride composition for powder molding to be suitably used for powder slush molding, and a polyvinyl chloride molded body and a laminate.

BACKGROUND ART

A polyvinyl chloride composition has excellent chemical resistance and durability. Particularly, a molded body obtained by molding a polyvinyl chloride composition blended with a plasticizer has excellent flexibility and a favorable texture and imparts a sense of luxuriousness, and is thus widely used as a facing material for automobile interior parts such as an instrument panel and a door trim. In particular, a laminate and the like formed of a molded body obtained by molding a polyvinyl chloride composition through powder slush molding and a polyurethane resin layer or the like is suitably used for automobile interior parts.

However, a molded body obtained by molding a polyvinyl chloride composition blended with a plasticizer has a problem in that the plasticizer moves to the surface of the molded body under the influence of heat, light, or the like, and thus the flexibility of the molded body is likely to decrease. To address this, Patent Document 1 proposes that bleeding of a plasticizer in a polyvinyl chloride composition can be suppressed and adhesiveness to a urethane foam molded body improves by further blending hydroxyl group-modified silicone oil into the polyvinyl chloride composition blended with a plasticizer. Patent Document 2 proposes that heat aging resistance of a molded body improves by using a polyvinyl chloride composition including polyvinyl chloride particles having an average polymerization degree of 2300 to 4100, and a plasticizer containing a trimellitate-based plasticizer and/or a pyromellitate-based plasticizer. Patent Document 3 proposes that physical properties such as tensile characteristics of a molded body improve by using a polyvinyl chloride composition including two types of polyvinyl chloride particles having different average particle diameters, and a specific trimellitic acid-based plasticizer.

PRIOR ART DOCUMENTS

Patent Documents

Patent Document 1: JP 2012-007026 A
Patent Document 2: WO 2014/091867
Patent Document 3: JP 2015-067728 A

DISCLOSURE OF INVENTION

Problem to be Solved by the Invention

In powder slush molding, a molded body is desired to be easily removed from a mold. As a facing for a vehicle interior material, a molded body is also desired to satisfy high odor requirements.

The present invention provides a polyvinyl chloride composition for powder molding from which a molded body having favorable heat aging resistance, high adhesiveness to a polyurethane foam layer, and easy releasability from a mold for slush molding, with less odor, can be produced, and a polyvinyl chloride molded body and a laminate.

Means for Solving Problem

The present invention relates to a polyvinyl chloride composition for powder molding, including: a polyvinyl chloride (A) having an average particle diameter of 50 μm or more and 500 μm or less; a polyvinyl chloride (B) having an average particle diameter of 0.01 μm or more and less than 50 μm; a plasticizer; and a phosphate. The average polymerization degree of the polyvinyl chloride (A) is 1350 or more. The phosphate is a polyoxyalkylene alkyl phosphate. The blending amount of the polyvinyl chloride (B) is 5 parts by mass or more and 40 parts by mass or less, the blending amount of the plasticizer is 120 parts by mass or more and 150 parts by mass or less, and the blending amount of the polyoxyalkylene alkyl phosphate is 0.1 parts by mass or more and 3.0 parts by mass or less with respect to 100 parts by mass of the polyvinyl chloride (A).

In the present invention, it is preferred that the plasticizer contains a trimellitic acid-based plasticizer. In the present invention, it is preferred that the polyoxyalkylene alkyl phosphate is a polyoxyethylene alkyl phosphate. In the present invention, it is preferred that the polyoxyethylene alkyl phosphate has a structure represented by General Formula (1) below:

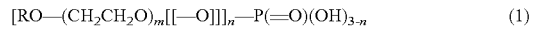

$$[RO-(CH_2CH_2O)_m[[-O]]]_n-P(=O)(OH)_{3-n} \quad (1)$$

(In General Formula (1), R is an alkyl group with 1 to 20 carbon atoms, m is an integer of 1 to 10, and n is an integer of 1 to 3).

In the present invention, it is preferable to use the polyvinylchloride composition for powder molding in powder slush molding.

The present invention also relates to a polyvinyl chloride molded body obtained by molding the polyvinyl chloride composition for powder molding through powder slush molding.

In the present invention, it is preferable to use the polyvinyl chloride molded body as a facing for a vehicle interior material.

The present invention also relates to a laminate obtained by laminating a polyurethane foam layer and the polyvinyl chloride molded body.

In the present invention, it is preferable to use the laminate as a vehicle interior material.

Effects of the Invention

The present invention provides a polyvinyl chloride composition for powder molding from which a molded body having favorable heat aging resistance, high adhesiveness to a polyurethane foam layer, and easy releasability from a mold for slush molding, with less odor, can be produced. Moreover, the present invention provides a polyvinyl chloride molded body having favorable heat aging resistance, high adhesiveness to a polyurethane foam layer, and easy releasability from a mold for slush molding, with less odor, and a laminate using the same.

DESCRIPTION OF THE INVENTION

The present inventors have conducted earnest studies to solve the above problems. As a result, it was found that by forming a polyvinyl chloride molded body by molding a polyvinyl chloride composition that is prepared by using a polyvinyl chloride (A) having an average polymerization degree of 1350 or more and an average particle diameter of 50 μm or more and 500 μm or less in combination with a polyvinyl chloride (B) having an average particle diameter of 0.01 μm or more and less than 50 μm as polyvinyl chlorides, and a polyoxyalkylene alkyl phosphate as a lubricant, and blending 5 parts by mass or more and 40 parts by mass or less of the polyvinyl chloride (B), 120 parts by mass or more and 150 parts by mass or less of a plasticizer, and 0.1 parts by mass or more and 3.0 parts by mass or less of the polyoxyalkylene alkyl phosphate with respect to 100 parts by mass of the polyvinyl chloride (A), the resultant polyvinyl chloride molded body can have high heat aging resistance, i.e., high tensile elongation at break after heat aging, high adhesiveness to a polyurethane foam layer, and easy releasability from a mold, with less odor.

Specifically, by blending 5 parts by mass or more and 40 parts by mass or less of the polyvinyl chloride (B) having an average particle diameter of 0.01 μm or more and less than 50 μm with respect to 100 parts by mass of the polyvinyl chloride (A) having an average particle diameter of 50 μm or more and 500 μm or less, the polyvinyl chloride (B) in the fine-particulate form having a smaller average particle diameter is arranged on at least part of the surface of the polyvinyl chloride (A) in the particulate form having a larger average particle diameter, whereby powder fluidity of the polyvinyl chloride composition increases, and processability is enhanced in the powder slush molding. Further, by blending 120 parts by mass or more and 150 parts by mass or less of the plasticizer with respect to 100 parts by mass of the polyvinyl chloride (A), heat aging resistance improves. By setting the average polymerization degree of the polyvinyl chloride (A) to 1350 or more, the polyvinyl chloride composition including a large amount of the plasticizer can be powdered easily. Moreover, by blending 0.1 parts by mass or more and 3.0 parts by mass or less of the polyoxyalkylene alkyl phosphate as a lubricant with respect to 100 parts by mass of the polyvinyl chloride (A), adhesiveness to a polyurethane foam layer improves, releasability from a mold improves, and odor reduces.

The average polymerization degree of the polyvinyl chloride (A) is not particularly limited as long as it is 1350 or more. From the viewpoint of powdering of the polyvinyl chloride composition more easily, the average polymerization degree of the polyvinyl chloride (A) is preferably 1400 or more. The upper limit of the average polymerization degree of the polyvinyl chloride (A) is not particularly limited, and for example, it is preferably 3800 or less. From the viewpoint of further improving the flexibility (tensile elongation at break) of a polyvinyl chloride molded body obtained by molding the polyvinyl chloride composition, the average polymerization degree of the polyvinyl chloride (A) is preferably 3500 or less, and more preferably 3000 or less. When the average polymerization degree of the polyvinyl chloride (A) is within the above range, the adhesiveness of the polyvinyl chloride molded body to a polyurethane foam layer improves. More specifically, the average polymerization degree of the polyvinyl chloride (A) is preferably 1350 or more and 3800 or less, more preferably 1350 or more and 3500 or less, and further preferably 1400 or more and 3000 or less.

The average particle diameter of the polyvinyl chloride (A) is not particularly limited as long as it is 50 μm or more and 500 μm or less, and for example, it is preferably 100 μm or more, and more preferably 150 μm or more. The average particle diameter of the polyvinyl chloride (A) is preferably 300 μm or less, and more preferably 200 μm or less; for example. More specifically, the average particle diameter of the polyvinyl chloride (A) is preferably 100 μm or more and 300 μm or less, more preferably 100 μm or more and 200 μm or less, and further preferably 150 μm or more and 200 μm or less, for example. When the average particle diameter of the polyvinyl chloride (A) is within the above range, the powder fluidity of the polyvinyl chloride composition increases, and the adhesiveness of the polyvinyl chloride molded body obtained by molding the polyvinyl chloride composition to a polyurethane foam layer improves. In the present invention, the average particle diameter of the polyvinyl chloride (A) is measured in accordance with JIS K 7369:2009.

The polyvinyl chloride (A) is not particularly limited, and may be, for example, a homopolymer of a vinyl chloride monomer and/or a copolymer of a vinyl chloride monomer and another copolymerizable monomer. Examples of the another copolymerizable monomer include, but are not particularly limited to, ethylene, propylene, vinyl acetate, allyl chloride, allyl glycidyl ether; acrylic ester, and vinyl ether.

The polyvinyl chloride (A) can be produced by any known polymerization method such as suspension polymerization or bulk polymerization. From the viewpoint of low cost and excellent thermal stability, the polyvinyl chloride (A) is preferably produced by suspension polymerization.

In the polyvinyl chloride composition for powder molding, the content, of the polyvinyl chloride (A) is not particularly limited, and it may be, for example, 30 mass % or more, or 35 mass % or more. Further, in the polyvinyl chloride composition for powder molding, the content of the polyvinyl chloride (A) may be, for example, 60 mass % or less, 55 mass % or less, 50 mass % or less, or 45 mass % or less. More specifically; in the polyvinyl chloride composition for powder molding, the content of the polyvinyl chloride (A) may be; for example, 30 mass % or more and 60 mass % or less; or 35 mass % or more and 55 mass % or less.

The average particle diameter of the polyvinyl chloride (B) is not particularly limited as long as it is 0.01 μm or more and less than 50 μm, and for example, it is preferably 0.1 μm or more, and more preferably 0.5 μm or more. The average particle diameter of the polyvinyl chloride (B) is preferably 20 μm or less, and more preferably 10 μm or less, for example. More specifically, the average particle diameter of the polyvinyl chloride (B) is preferably 0.1 μm or more and 20 μm or less, and more preferably 0.5 μm or more and 10 μm or less, for example. When the average particle diameter of the polyvinyl chloride (B) is within the above range, the powder fluidity of the polyvinyl chloride composition increases. In the present invention, the average particle diameter of the polyvinyl chloride (B) is measured by a laser diffraction-scattering particle size distribution measuring device, for example, a particle size distribution measuring device MICROTRAC/HRA (9320-X100) manufactured by Nikkiso Co., Ltd.

The average polymerization degree of the polyvinyl chloride (B) is not particularly limited, and may be, for example, 500 or more, or 800 or more. The upper limit of the average polymerization degree of the polyvinyl chloride (B) is not particularly limited, and may be, for example, 2000 or less, or 1500 or less. More specifically the average polymerization degree of the polyvinyl chloride (B) may be, for example, 500 or more and 2000 or less, or 800 or more and 1500 or less. When the average polymerization degree of the polyvinyl chloride (B) is within the above range, the powder fluidity of the polyvinyl chloride composition increases, and the processability in molding is enhanced.

The polyvinyl chloride (B) is not particularly limited, and may be, for example, a homopolymer of a vinyl chloride monomer and/or a copolymer of a vinyl chloride monomer and another copolymerizable monomer. Examples of the another copolymerizable monomer include, but are not particularly limited to, ethylene, propylene, vinyl acetate, allyl chloride, allyl glycidyl ether, acrylic ester, and vinyl ether.

The polyvinyl chloride (B) can be produced by any known polymerization method such as emulsion polymerization, seeded emulsion polymerization, fine suspension polymerization, or seeded fine suspension polymerization. From the viewpoint of easily obtaining fine particles, the polyvinyl chloride (B) is preferably produced by fine suspension polymerization.

In the polyvinyl chloride composition for powder molding, the blending amount of the polyvinyl chloride (B) is not particularly limited as long as it is 5 parts by mass or more and 40 parts by mass or less with respect to 100 parts by mass of the polyvinyl chloride (A), and for example, it is preferably 10 parts by mass or more. The upper limit of the blending amount of the polyvinyl chloride (B) is preferably 30 parts by mass or less with respect to 100 parts by mass of the polyvinyl chloride (A). When the blending amount of the polyvinyl chloride (B) with respect to the polyvinyl chloride (A) is within the above range, the powder fluidity of the polyvinyl chloride composition increases, and the adhesiveness of the polyvinyl chloride molded body obtained by molding the polyvinyl chloride composition to a polyurethane foam layer improves.

In the polyvinyl chloride composition for powder molding, the blending amount of the plasticizer is not particularly limited as long as it is 120 parts by mass or more and 150 parts by mass or less with respect to 100 parts by mass of the polyvinyl chloride (A). For example, from the viewpoint of further improving the heat aging resistance and reducing the mold release resistance of the polyvinyl chloride molded body, the blending amount of the plasticizer is preferably 125 parts by mass or more. From the viewpoint of easily powdering of the polyvinyl chloride composition and reducing the odor, the blending amount of the plasticizer is preferably 145 parts by mass or less. More specifically the blending amount of the plasticizer is preferably 125 parts by mass or more and 150 parts by mass or less, and more preferably 125 parts by mass or more and 145 parts by mass or less with respect to 100 parts by mass of the polyvinyl chloride (A).

Any plasticizer that can be used as a plasticizer for a polyvinyl chloride be used. For example, trimellitic acid-based plasticizers, phthalic acid-based plasticizers, pyromellitic acid-based plasticizers, epoxy-based plasticizers, and polyester-based plasticizers can be used. Trimellitic acid-based plasticizers are preferred from the viewpoint that the plasticizers are less likely to move and bleed out, and the heat aging resistance is further improved. Phthalic acid-based plasticizers also may be used from the viewpoint of versatility.

Examples of the trimellitic acid-based plasticizers include, but are not particularly limited to, tri(2-ethylhexyl) trimellitate, tri(n-octyl) trimellitate, triisooctyl trimellitate, triisodecyl trimellitate, triisononyl trimellitate, di(n-octyl) mono(n-decyl) trimellitate, and diisooctyl monoisodecyl trimellitate.

Examples of the phthalic acid-based plasticizers include, but are not particularly limited to, di(n-butyl) phthalate, di(n-octyl) phthalate, di(2-ethylhexyl) phthalate, diisooctyl phthalate, octyldecyl phthalate, diisodecyl phthalate, butylbenzyl phthalate, and di(2-ethylhexyl) isophthalate.

Examples of the pyromellitic acid-based plasticizers include, but are not particularly limited to, tetra(2-ethylhexyl) pyromellitate and tetra(n-octyl) pyromellitate. Examples of the epoxy-based plasticizers include, but are not particularly limited to, epoxidized soybean oil, epoxidized flaxseed oil, and epoxidized (2-ethylhexyl) tall oil fatty acid. Examples of the polyester-based plasticizers include, but are not particularly limited to, (1,3-butanediol) (2-ethylhexanol) adipate-based polyester, (1,6-hexanediol) (2-ethylhexanol) sebacate-based polyester, and (propylene glycol)(coconut oil fatty acid) adipate-based polyester.

The plasticizers may be used alone or in combination of two or more.

In the polyvinyl chloride composition for powder molding, a polyoxyalkylene alkyl phosphate plays a role as a lubricant that imparts internal lubrication. By using a polyoxyalkylene alkyl phosphate, it is possible to reduce the mold release resistance when a polyvinyl chloride molded body is released from a slush mold while improving the adhesiveness of the polyvinyl chloride molded body to a polyurethane foam layer. In the polyvinyl chloride composition for powder molding, the blending amount of the polyoxyalkylene alkyl phosphate is not particularly limited as long as it is 0.1 parts by mass or more and 3.0 parts by mass or less with respect to 100 parts by mass of the polyvinyl chloride (A). For example, from the viewpoint of further reducing the mold release resistance of the polyvinyl chloride molded body, the blending amount of the polyoxyalkylene alkyl phosphate is preferably 0.2 parts by mass or more, and more preferably 0.3 parts by mass or more. From the viewpoint of reducing the odor of the polyvinyl chloride molded body, the blending amount of the polyoxyalkylene alkyl phosphate is preferably 2.9 parts by mass or less, and more preferably 2.8 parts by mass or less. More specifically; the blending amount of the polyoxyalkylene alkyl phosphate is preferably 0.2 parts by mass or more and 3.0 parts by mass or less, and more preferably 0.3 parts by mass or more and 2.9 parts by mass or less with respect to 100 parts by mass of the polyvinyl chloride (A).

The polyoxyalkylene alkyl phosphate is a compound obtained through dehydration condensation of a phosphoric acid and a polyoxyalkylene alkylether. The polyoxyalkylene alkyl phosphate is not particularly limited, and may be, for example, a polyoxyethylene alkyl phosphate or a polyoxypropylene alkyl phosphate. From the viewpoint of high mold releasability, it is preferable to use a polyoxyethylene alkyl phosphate having a structure represented by General Formula (1) below.

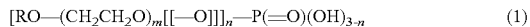

$$[RO\text{—}(CH_2CH_2O)_m[[\text{—}O]]]_n\text{—}P(\text{=}O)(OH)_{3\text{-}n} \quad (1)$$

In General Formula (1), R is preferably an alkyl group with 1 to 20 carbon atoms, more preferably an alkyl group with 3 to 18 carbon atoms, and further preferably an alkyl group with 4 to 16 carbon atoms. m is preferably an integer of 1 to 10, and more preferably an integer of 2 to 10. n may be an integer of 1 to 3. That is, the polyoxyethylene alkyl phosphate may be any of a monoester (n=1), a diester (n=2) or a triester (n=3). When the polyoxyethylene alkyl phosphate is a diester (n=2) or triester (n=3), a plurality of polyoxyethylene alkyl groups in one molecule may be the same or different from each other. The polyoxyethylene alkyl phosphate is preferably a diester from the viewpoint of reducing odor. Examples of the polyoxyethylene alkyl phosphate having a structure represented by General Formula (1)

include commercially available products such as "DDP-2" (n=2, m=2, R=C12-15), "DDP-4" (n=2, m=4, R=C12-15), "DDP-6" (n=2, m=6, R=C12-15), "DDP-8" (n 2, m=8, R=C12-15), "DDP-10" (n=2, m=10, R=C12-15), "TDP-2" (n=3, m=2, R=C12-15), "TDP-8" (n 3, m=8, R=C12-15), and "TDP-10" (n=3, m=10, R=C12-15), which are produced by Nikko Chemicals Co., Ltd. Here, "C12-15" means an alkyl group with 12 to 15 carbon atoms.

The polyoxyethylene alkyl phosphates may be used alone or in combination of two or more.

The polyvinyl chloride composition for powder molding may optionally include resin compounding agents such as a stabilizer, a colorant, an antioxidant, a filler, and an ultraviolet absorber.

Examples of the stabilizer include epoxy-based stabilizers, barium-based stabilizers, calcium-based stabilizers, tin-based stabilizers, zinc-based stabilizers, hindered amine-based light stabilizers, and composite stabilizers such as calcium-zinc-based (Ca—Zn-based) stabilizers and barium-zinc-based (Ba—Zn-based) stabilizers. The stabilizers may be used alone or in combination of two or more. The blending amount of the stabilizer is preferably 0.01 parts by mass or more and 8 parts by mass or less with respect to 100 parts by mass of the polyvinyl chloride (A).

Examples of the colorant include titanium oxide, zinc oxide, and carbon black. Commercially available pigments such as blue pigments and red pigments may also be used as the colorant. The colorants may be used alone or in combination of two or more.

The polyvinyl chloride composition for powder molding can be produced by mixing the polyvinyl chloride (A), the polyvinyl chloride (B), the plasticizer, the polyoxyalkylene alkyl phosphate, and optionally other resin compounding agents as needed. The mixing method is not particularly limited, and for example, a dry blending method is preferred. The mixer is not particularly limited; and for example, a super mixer can be used.

The average particle diameter of the polyvinyl chloride composition for powder molding is not particularly limited, and for example, it may be 50 μm or more, 100 μm or more, or 150 μm or more. The average particle diameter of the polyvinyl chloride composition for powder molding is not particularly limited, and for example, it may be 500 μm or less, 300 μm or less, or 200 μm or less. More specifically; the average particle diameter of the polyvinyl chloride composition for powder molding may be, for example, 50 μm or more and 500 μm or less. From the viewpoint of powder fluidity for example, the average particle diameter is preferably 100 μm or more and 300 μm or less, more preferably 100 μm or more and 200 μm or less, and further preferably 150 μm or more and 200 μm or less. The average particle diameter of the polyvinyl chloride composition for powder molding is measured in accordance with JIS K 7369:2009.

In the present specification, the average polymerization degrees of the polyvinyl chloride (A) and the polyvinyl chloride (B) are measured in accordance with JIS K 6720-2:1999.

The powder yield of the polyvinyl chloride composition for powder molding is not particularly limited, and for example, it is preferably 85% or more, and more preferably 90% or more. The powder yield of the polyvinyl chloride composition for powder molding is determined in the following manner. The polyvinyl chloride composition for powder molding is passed through a sieve with a mesh (mesh size 42: 355 μm), a mass (Wa) of the composition before passing through the sieve and a mass (Wb) of the composition after passing therethrough are measured, and the measured values are substituted into the formula below.

Powder yield (%)=$Wb/Wa \times 100$

The polyvinyl chloride molded body is obtained by molding the polyvinyl chloride composition for powder molding through powder slush molding. Therefore, the composition of the polyvinyl chloride molded body is the same as that of the polyvinyl chloride composition for powder molding. When the cross section of the polyvinyl chloride molded body is observed, an interface between particles of the polyvinyl chloride composition for powder molding used in powder slush molding is confirmed. Thus, it is possible to confirm that the molded body is produced through powder slush molding, that is, the molded body is a powder slush molded body.

Although there is no particular limitation on the powder slush molding method, a method as described below can be used. A slush molding machine including a powder box and a mold for slush molding (also referred to simply as "mold" hereinafter) is prepared, and the polyvinyl chloride composition for powder molding is introduced into the powder box, while the mold is heated to a predetermined temperature (e.g., 230° C. or higher and 280° C. or lower). Next, the slush molding machine is inverted to bring the polyvinyl chloride composition for powder molding into contact with the surface of the mold heated to the predetermined temperature, and is kept in this state for a predetermined period of time (e.g., 3 seconds or more and 15 seconds or less). Thereafter, the slush molding machine is inverted again, and the mold is cooled (to a temperature of 10° C. or higher and 60° C. or lower, for example). Then, a molded body is removed from the cooled mold.

The shape of the polyvinyl chloride molded body is not particularly limited, and it may be formed in a sheet-like shape, for example. When the polyvinyl chloride molded body has a sheet-like shape (in this case, the molded body is also referred to as "polyvinyl chloride sheet" hereinafter), there is no particular limitation on its thickness, but it may have a thickness of 3.0 mm or less, or 2.0 mm or less, or 1.6 mm or less, for example. In addition, it may have a thickness of 0.5 mm or more, or 0.6 mm or more, or 0.8 mm or more. More specifically, if the polyvinyl chloride molded body has a sheet-like shape, it may have a thickness of 0.5 mm or more and 3.0 mm or less, or 0.6 mm or more and 2.0 mm or less, or 0.8 mm or more and 1.6 mm or less.

In the present invention, the mold release resistance of the polyvinyl chloride molded body is preferably 1.3 kg or less, more preferably 1.2 kg or less, further preferably 1.1 kg or less, and particularly preferably 1.0 kg or less from the viewpoint of easy releasability from a mold. In the present invention, the mold release resistance of the polyvinyl chloride molded body can be confirmed in the following manner. A sheet-like polyvinyl chloride molded body (polyvinyl chloride sheet) having a thickness of 1.0 mm obtained at a mold temperature of 260° C. is cooled until the mold temperature drops to 50° C. Then, in the removal of the polyvinyl chloride sheet from the mold, the mold is placed on a platform scale such that the vertical surface will face downward. The mold release resistance of the polyvinyl chloride sheet is determined by measuring a maximum load applied when the polyvinyl chloride sheet is removed from the top to the bottom for a distance of 20 cm at a speed of 0.25 sec/cm.

In the present invention, the tensile elongation at break at −10° C. of the r polyvinyl chloride molded body after heating at 125° C. for 200 hours (also referred to as heat aging) is preferably 140% or more, more preferably 160% or more, and further preferably 180% or more, for example. In the present invention, the tensile elongation at break at −10° C. of the polyvinyl chloride molded body after heating at 125° C. for 200 hours is measured in accordance with a modified method of JIS K 6251 in which a distance between two chucks that hold a sample (polyvinyl chloride molded body) is employed instead of a distance between reference lines. A polyvinyl chloride molded body to be used for the measurement of the tensile elongation at break after heat aging can be prepared as follows. A resin laminate formed by laminating a polyvinyl chloride molded body and a polyurethane foam layer is heated at 125° C. for 200 hours, and then the polyvinyl chloride molded body is removed from the resin laminate and used for the measurement of the tensile elongation at break.

The polyvinyl chloride molded body can be suitably used as a facing for a vehicle interior material such as that for an instrument panel, a door trim, a trunk trim, a seat, a pillar cover, a ceiling material, a rear tray; a console box, an air bag cover, an armrest, a headrest, a meter cover, or a crash pad, in a vehicle such as an automobile, but there is no particular limitation thereto.

The polyvinyl chloride molded body and a polyurethane foam layer (also referred to as "polyurethane foam molded body") can be laminated and used as a laminate. Examples of the lamination method include, but are not particularly limited to, a method in which a polyvinyl chloride molded body and a polyurethane foam molded body are separately produced and then attached to each other through thermal fusion bonding or thermal adhesion, or using a known adhesive; and an isocyanate, polyol, and the like, which are raw materials of a polyurethane foam molded body, are reacted and polymerized on a polyvinyl chloride molded body and polyurethane is foamed using a known method to form a laminate. The latter method is preferable because the process is simple, and the polyvinyl chloride molded body and the polyurethane foam molded body can be reliably adhered to each other even when laminates with various shapes are formed.

The laminate may include a polyurethane foam layer, a polyvinyl chloride molded body (also referred to as "polyvinyl chloride layer") laminated on one surface of the polyurethane foam layer, and another resin layer laminated on the other surface of the polyurethane foam layer. The other resin layer may be a layer of a polyolefin-based resin (e.g., polypropylene and/or a polyethylene-polypropylene copolymer) or ABS (Acrylonitrile-Butadiene-Styrene) resin, for example. Such a laminate can be manufactured by foaming polyurethane between the polyvinyl chloride layer and the other resin layer, for example.

The laminate can be suitably used as a vehicle interior material such as that for an instrument panel, a door trim, a trunk trim, a seat, a pillar cover, a ceiling material, a rear tray, a console box, an air bag cover, an armrest, a headrest, a meter cover, or a crash pad, in a vehicle such as automobile, there is no particular limitation thereto.

EXAMPLES

Hereinafter, the present invention will be described further specifically by way of examples. However, the present invention is not limited to the following examples.

Raw materials listed in Table 1 below were used in Examples and Comparative Examples.

<Polyvinyl Chloride>
(1) Vinyl chloride homopolymer "S1004D" manufactured by KANEKA CORPORATION, average polymerization degree: 1400, average particle diameter: 159 μm
(2) Vinyl chloride homopolymer "KS-3000" manufactured KANEKA CORPORATION, average polymerization degree: 3000, average particle diameter: 170 μm
(3) Vinyl chloride homopolymer "TH-3800" manufactured by TAIYO VINYL CORPORATION, average polymerization degree: 3800, average particle diameter: 175 μm
(4) Vinyl chloride homopolymer "S1001T" manufactured by KANEKA CORPORATION, average polymerization degree: 1000, average particle diameter: 210 μm
(5) Vinyl chloride homopolymer "PSM-31" manufactured by KANEKA CORPORATION, average polymerization degree: 1300, average particle diameter: 10 μm <Plasticizer>
(1) Tri(n-octyl) trimellitate "C-8L" manufactured by ADEKA CORPORATION
(2) Tri(2-ethylhexyl) trimellitate "C-8" manufactured by ADEKA CORPORATION
(3) Diisononyl phthalate "DINP" manufactured by CG ESTER CORPORATION <Phosphate>
(1) Polyoxyethylene alkyl (12-15) ether phosphate (2E.O.) "DDP-2" manufactured by Nikko Chemicals Co., Ltd., diester, wax
(2) Polyoxyethylene alkyl (12-15) ether phosphate (6E.O.) "DDP-6" manufactured by Nikko Chemicals Co., Ltd., diester, wax
(3) Polyoxyethylene alkyl (12-15) ether phosphate) (10E.O.) "DDP-10" manufactured by Nikko Chemicals Co., Ltd., diester, wax
(4) Di(2-ethylhexyl) phosphate manufactured by TOKYO CHEMICAL INDUSTRY CO., LTD, liquid <Stabilizer>
(1) Zinc stearate
(2) Sodium perchlorate
(3) Hindered amine light stabilizer (HALS)
(4) Epoxidized soybean oil
Lubricant (fatty add ester): 1,2-hydroxystearic acid "LS-12" manufactured by ADEKA CORPORATION, semi-wax Example 1

<Production of Polyvinyl Chloride Composition for Powder Molding>

Into a 100 L super mixer (manufactured by KAWATA MFG. Co., Ltd.), 100 parts by mass of the polyvinyl chloride (1), 125 parts by mass of the plasticizer (1), 0.6 parts by mass of the phosphate (1), 5 parts by mass of the stabilizer (1), 1.5 parts by mass of the stabilizer (2), 0.3 parts by mass of the stabilizer (3), 5 parts by mass of the stabilizer (4) and 3 parts by mass of a pigment (black) were introduced and mixed at 70° C. Next, the mixture thus obtained was dried and then cooled to a temperature of 50° C. or lower. Then, 25 parts by mass of the polyvinyl chloride (5) was added thereto and mixed to produce a polyvinyl chloride composition for powder molding (powder).

<Production of Polyvinyl Chloride Molded Body>
Powder slush molding using the polyvinyl chloride composition for powder molding obtained as described above was performed using a box-type slush molding machine including a mold for slush molding provided with an embossed flat plate (with a length of 22 cm and a width of 31 cm) and a powder box (with a length of 22 cm, a width of 31 cm, and a depth of 16 cm). Specifically, first, 2 kg of the polyvinyl chloride composition for powder molding was introduced into the powder box, and the mold for slush molding heated to 280° C. was set in the slush molding machine. Next, when the temperature of the mold reached 260° C., the slush molding machine was inverted and the polyvinyl chloride composition for powder molding was held in the mold for about 10 to 12 seconds such that a polyvinyl chloride sheet (also referred to as "PVC sheet") would have a thickness of 1.0 mm. Then, the slush molding machine was inverted. After 60 seconds, the mold was cooled to 50° C. using cooling water. Next, the PVC sheet was removed from the mold, and a polyvinyl chloride molded body was obtained. The mold release resistance of the PVC sheet when the sheet was removed from the mold was measured in the manner described below <Production of Laminate>

The PVC sheet obtained as described above was placed on the bottom of a mold for foaming (190 mm×240 mm×11 mm). Next, a raw material solution prepared by mixing 36 g of liquid A containing 4,4'-diphenylmethane-diisocyanate and 78 g of liquid B containing polyether polyol (containing; 1.0 mass % of triethylenediamine and 1.6 mass % of water) was poured onto the PVC sheet, and the mold was sealed. After a predetermined period of time, a laminate including the PVC sheet (facing) with a thickness of about 1 mm and a polyurethane foam layer (backing material) with a thickness of about 9 mm laminated on the PVC sheet was collected from the mold.

Examples 2-4

Polyvinyl chloride compositions for powder molding, polyvinyl chloride molded bodies and laminates of Examples 2-4 were produced in the same manner as in Example 1 except for the kind of the phosphate as indicated in Table 1 and the blending amount of the phosphate as indicated in Table 1.

Example 5

A polyvinyl chloride composition for powder molding, a polyvinyl chloride molded body and a laminate of Example 5 were produced in the same manner as in Example 2 except for the use of the polyvinyl chloride (2) in place of the polyvinyl chloride (1).

Example 6

A polyvinyl chloride composition for powder molding, a polyvinyl chloride molded body and a laminate of Example 6 were produced in the same manner as in Example 2 except for the blending amount of the plasticizer as indicated in Table 1.

Examples 7-8

Polyvinyl chloride compositions for powder molding, polyvinyl chloride molded bodies and laminates of Examples 7-8 were produced in the same manner as in Example 2 except for the kind of the plasticizer as indicated in Table 1.

Example 9

A polyvinyl chloride composition for powder molding, a polyvinyl chloride molded body and a laminate of Example 9 were produced in the same manner as in Example 1 except for the kind of the phosphate as indicated in Table 1.

Example 10

A polyvinyl chloride composition for powder molding, a polyvinyl chloride molded body and a laminate of Example 10 were produced in the same manner as in Example 2 except for the use of the polyvinyl chloride (3) in place of the polyvinyl chloride (1).

Comparative Examples 1-2

Polyvinyl chloride compositions for powder molding, polyvinyl chloride molded bodies and laminates of Comparative Examples 1-2 were produced in the same manner as in Example 2 except for the blending amount of the phosphate as indicated in Table 2 below.

Comparative Examples 3-4

Polyvinyl chloride compositions for powder molding, polyvinyl chloride molded bodies and laminates of Comparative Examples 3-4 were produced in the same manner as in Example 2 except for the blending amount of the plasticizer as indicated in Table 2 and the use of 1,2-hydroxystearic add in place of phosphate.

Comparative Example 5

A polyvinyl chloride composition for powder molding, a polyvinyl chloride molded body and a laminate of Comparative Example 5 were produced in the same manner as in Example 2 except for the blending amount of the plasticizer as indicated in Table 2.

Comparative Example 6

A polyvinyl chloride composition for powder molding, a polyvinyl chloride molded body and a laminate of Comparative Example 6 were produced in the same manner as in Example 2 except for the kind of the phosphate as indicated in Table 2.

Comparative Example 7

A polyvinyl chloride composition for powder molding of Comparative Example 7 was produced in the same manner as in Example 2 except for the use of the polyvinyl chloride (4) in place of the polyvinyl chloride (1). The resultant could not be powdered.

Comparative Example 8

A polyvinyl chloride composition for powder molding, a polyvinyl chloride molded body and a laminate of Comparative Example 8 were produced in the same manner as in Example 10 except for the blending amount of the plasticizer as indicated in Table 2.

In Examples and Comparative Examples, the average particle diameter and the powder yield of each polyvinyl chloride composition for powder molding were measured as below. Moreover, in Examples and Comparative Examples, the mold release resistance, the odor, the tensile elongation at break after heat aging, and the adhesiveness to urethane of each polyvinyl chloride molded body were measured and evaluated as below. Tables 1 and 2 show the results.

(Powder Yield)

The powder yield of each polyvinyl chloride composition for powder molding was determined in the following manner. The polyvinyl chloride composition for powder molding was passed through a sieve with a mesh (mesh size 42: 355 μm), a mass (Wa) of the composition before passing through the sieve and a mass (Wb) of the composition after passing therethrough were measured, and the measured values were substituted into the formula below.

Powder yield (%)=$Wb/Wa \times 100$ (Average Particle Diameter)

The average particle diameter of each polyvinyl chloride composition for powder molding was measured in accordance with JIS K 7369:2009.

(Mold Release Resistance)

In Examples and Comparative Examples, in the removal of the PVC sheet from the mold, the mold was placed on a platform scale such that the vertical surface would face downward. The mold release resistance was determined by measuring a maximum load applied when the PVC sheet was removed from the top to the bottom for a distance of 20 cm at a speed of 0.25 sec/cm. The PVC sheet having a molding stress of 1.3 kg or less was judged to have easy releasability from a slush mold.

(Odor Evaluation)

The PVC sheet was cut into 10 cm×15 cm, rolled in a cylindrical shape, and placed in a wide-mouthed 500 mL reagent bottle (made of glass with a fit lid). Then, the bottle was lidded and heated in an oven at 100° C. for 30 minutes. Odor in the reagent bottle was evaluated in a sensory test by three each of men and women (all evaluators were non-smokers and sensitive to odor). The degree of the odor was measured in accordance with the following criteria. An odor evaluation value is an arithmetic mean (rounded to the first decimal place) of scores given by the evaluators. The value of 3 or higher was judged as acceptable.

5: No pungent odor
4: Slight pungent odor
3: Weak pungent odor
2: Pungent odor
1: Strong pungent odor (Adhesiveness to Urethane)

The adhesiveness to urethane was evaluated as follows. After a lapse of 12 hours or more at room temperature after production of a laminate, the PVC sheet was peeled off from the polyurethane foam layer. If the polyurethane foam layer adhering to the PVC sheet was completely destroyed, the PVC sheet was judged to have good adhesiveness to urethane. If interfacial peeling was observed even in one part, the PVC sheet was judged to have poor adhesiveness to urethane.

(Tensile Elongation at Break after Heat Aging)

The laminate was placed into an oven and heated at 125° C. for 200 hours for heat aging. Thereafter, the PVC sheet was removed from the laminate. The removed PVC sheet was punched into a No. 3 dumbbell shape to obtain a No. 3 dumbbell-shaped sample Next, the two ends of the sample were held by two chucks (the distance between the chucks was 40 mm). After the sample was kept in a chamber at −10° C. for 3 minutes, the tensile elongation at break (tensile elongation (%) at break after heat aging) of the sample was measured at a tension speed of 200 mm/minute. The PVC sheet having a tensile elongation at break after heat aging of 140% or more was judged as acceptable.

TABLE 2

| | Comparative Example | 1 | 2 | 3 | 4 | 5 | 6 | 7 | 8 |
|---|---|---|---|---|---|---|---|---|---|
| Polyvinyl chloride (parts by mass) | 1 (average polymerization degree: 1400; average particle diameter: 159 μm) | 100 | 100 | 100 | 100 | 100 | 100 | — | — |
| | 3 (average polymerization degree: 3800; average particle diameter: 175 μm) | — | — | — | — | — | — | — | 100 |
| | 4 (average polymerization degree: 1000; average particle diameter: 210 μm) | — | — | — | — | — | — | 100 | — |
| | 5 (average polymerization degree: 1300; average particle diameter: 10 μm) | 25 | 25 | 25 | 25 | 25 | 25 | 25 | 25 |
| Plasticizer (parts by mass) | Tri(n-octyl) trimellitate | 125 | 125 | 125 | 110 | 110 | 125 | 125 | 160 |
| Phosphate (parts by mass) | Polyoxyethylene alkyl (12-15) ether phosphate (6E.O.) | 0.5 | 3.2 | — | — | 0.6 | — | 0.6 | 0.6 |
| | Di(2-ethylhexyl) phosphate | — | — | — | — | — | 0.6 | — | — |
| | 1,2-Hydroxystearic acid (parts by mass) | — | — | 0.6 | 0.6 | — | — | — | — |
| Polyvinyl chloride composition (powder) | Average particle diameter (μm) | 209 | 190 | 224 | 189 | 182 | 202 | Could not be powdered | 215 |
| | Powder yield (%) | 90 | 98 | 85 | 99 | 99 | 94 | | 88 |
| Polyvinyl chloride molded body | Mold release resistance (kg) | 1.5 | 0.4 | 1.2 | 1.4 | 1.6 | 1.4 | | 0.4 |
| | Tensile elongation at break after heat aging (%) | 205 | 200 | 192 | 173 | 176 | 198 | | 268 |
| | Adhesiveness to urethane | Good | Good | Poor | Poor | Good | Good | | Good |
| | Odor | 3 | 2 | 3 | 3 | 3 | 1 | | 1 |

TABLE 1

| | Example | 1 | 2 | 3 | 4 | 5 | 6 | 7 | 8 | 9 | 10 |
|---|---|---|---|---|---|---|---|---|---|---|---|
| Polyvinyl chloride (parts by mass) | 1 (average polymerization degree: 1400; average particle diameter: 159 μm) | 100 | 100 | 100 | 100 | — | 100 | 100 | 100 | 100 | — |
| | 2 (average polymerization degree: 3000; average particle diameter: 170 μm) | — | — | — | — | 100 | — | — | — | — | — |
| | 3 (average polymerization degree: 3800; average particle diameter: 175 μm) | — | — | — | — | — | — | — | — | — | 100 |

TABLE 1-continued

| | Example | 1 | 2 | 3 | 4 | 5 | 6 | 7 | 8 | 9 | 10 |
|---|---|---|---|---|---|---|---|---|---|---|---|
| | 5 (average polymerization degree: 1300; average particle diameter: 10 μm) | 25 | 25 | 25 | 25 | 25 | 25 | 25 | 25 | 25 | 25 |
| Plasticizer (parts by mass) | Tri(n-octyl) trimellitate | 125 | 125 | 125 | 125 | 125 | 120 | — | — | 125 | 125 |
| | Tri(2-ethylhexyl) trimellitate | — | — | — | — | — | — | 125 | — | — | — |
| | Diisononyl phthalate | — | — | — | — | — | — | — | 125 | — | — |
| Phosphate (parts by mass) | Polyoxyethylene alkyl (12-15) ether phosphate (2E.O.) | 0.6 | — | — | — | — | — | — | — | — | — |
| | Polyoxyethylene alkyl (12-15) ether phosphate (6E.O.) | — | 0.6 | 0.2 | 2.9 | 0.6 | 0.6 | 0.6 | 0.6 | — | 0.6 |
| | Polyoxyethylene alkyl (12-15) ether phosphate (10E.O.) | — | — | — | — | — | — | — | — | 0.6 | — |
| Polyvinyl chloride composition (powder) | Average particle diameter (μm) | 197 | 201 | 190 | 191 | 181 | 180 | 203 | 201 | 210 | 190 |
| | Powder yield (%) | 94 | 97 | 96 | 95 | 99 | 99 | 94 | 95 | 90 | 99 |
| Polyvinyl chloride molded body | Mold release resistance (kg) | 0.7 | 0.7 | 0.8 | 0.4 | 0.8 | 1.0 | 0.8 | 0.6 | 0.8 | 0.6 |
| | Tensile elongation at break after heat aging (%) | 200 | 198 | 201 | 203 | 224 | 190 | 201 | 141 | 197 | 142 |
| | Adhesiveness to urethane | Good | Good | Good | Good | Good | Good | Good | Good | Good | Good |
| | Odor | 3 | 3 | 3 | 3 | 3 | 3 | 3 | 3 | 3 | 3 |

The results of Table 1 indicate that the polyvinyl chloride molded bodies of Examples 1-10, which were produced using the polyvinyl chloride compositions each prepared by blending: 5 parts by mass or more and 40 parts by mass or less of the polyvinyl chloride (B) having an average particle diameter of 0.01 μm or more and less than 50 μm; 120 parts by mass or more and 150 parts by mass or less of the plasticizer; and 0.1 parts by mass or more and 3.0 parts by mass or less of the polyoxyalkylene alkyl phosphate, with respect to 100 parts by mass of the polyvinyl chloride (A) having an average particle diameter of 50 μm or more and 500 μm or less and an average polymerization degree of 1350 or more, had easy releasability from a mold for slush molding, high tensile elongation at break after heat aging, i.e., high heat aging resistance, and high adhesiveness to a polyurethane foam layer, with weak pungent odor. The comparisons between Examples 1, 2, 5, 7, 9 and Example 8 indicate that the use of the trimellitic acid-based plasticizer as a plasticizer further improved the tensile elongation at break after heat aging and resulted in higher heat aging resistance. The comparisons between Examples 2, 5 and Example 10 indicate that the use of the polyvinyl chloride (A) having an average polymerization degree of 3500 or less further improved the tensile elongation at break after heat aging and resulted in higher heat aging resistance.

On the other hand, the results of Table 2 indicate that the polyvinyl chloride molded body of Comparative Example 1 in which the blending amount of the polyoxyalkylene alkyl phosphate was less than 0.1 parts by mass resulted in the mold release resistance exceeding 1.3 kg, and thus was difficult to be released from a mold for slush molding. The polyvinyl chloride molded body of Comparative Example 2 in which the blending amount of the polyoxyalkylene alkyl phosphate exceeded 3 parts by mass resulted in an odor evaluation value of 2 or lower and had pungent odor. The polyvinyl chloride molded bodies of Comparative Examples 3 and 4 in which the polyoxyalkylene alkyl phosphate was not used and 1,2-hydroxystearic acid was used as a lubricant resulted in poor adhesiveness to the poly urethane foam layer. The polyvinyl chloride molded body of Comparative Example 4 in which the content of the plasticizer was less than 120 parts by mass resulted in the mold release resistance exceeding 1.3 kg and thus was difficult to be released from a mold for slush molding. The polyvinyl chloride molded body of Comparative Example 5 in which the polyoxyalkylene alkyl phosphate was used but the content of the plasticizer was less than 120 parts by mass resulted in the mold release resistance exceeding 1.3 kg, and thus was difficult to be released from a mold for slush molding. The polyvinyl chloride molded body of Comparative Example 6 in which di(2-ethylhexyl) phosphate was used as a phosphate resulted in the mold release resistance exceeding 1.3 kg, and thus was difficult to be released from a mold for slush molding; besides, it resulted in an odor evaluation value of 1 and had strong pungent odor. Comparative Example 7 in which the polyvinyl chloride used had an average particle diameter of 50 μm or more and 500 μm or less but had an average polymerization degree of less than 1350 failed to obtain a powdered polyvinyl chloride composition. The polyvinyl chloride molded body of Comparative Example 8 in which the blending amount of the plasticizer exceeded 150 parts by mass resulted in an odor evaluation value of 1 and had strong pungent odor.

The invention claimed is:

1. A polyvinyl chloride composition for powder molding, comprising:
   a polyvinyl chloride (A) having an average particle diameter of 50 to 500 μm;
   a polyvinyl chloride (B) having an average particle diameter of 0.01 μm or more and less than 50 μm;
   a plasticizer; and
   a phosphate,
   wherein:
      an average polymerization degree of the polyvinyl chloride (A) is 1350 or more,
      the phosphate consists of a polyoxyalkylene alkyl phosphate, and
      the polyvinyl composition contains the polyvinyl chloride (B) in an amount of 5 to 40 parts by mass, the plasticizer in an amount of 120 to 150 parts by mass, and the polyoxyalkylene alkyl phosphate in an amount of 0.1 to 3.0 parts by mass, with respect to 100 parts by mass of the polyvinyl chloride (A).

2. The polyvinyl chloride composition for powder molding according to claim 1, wherein the plasticizer comprises a trimellitic acid-based plasticizer.

3. The polyvinyl chloride composition for powder molding according to claim 1, wherein the polyoxyalkylene alkyl phosphate is a polyoxyethylene alkyl phosphate.

4. The polyvinyl chloride composition for powder molding according to claim 3,
wherein the polyoxyethylene alkyl phosphate has a structure represented by general formula (1) below:

$$[RO-(CH_2CH_2O)_m[[-O]]]_n-P(=O)(OH)_{3-n} \qquad (1)$$

where R is an alkyl group with 1 to 20 carbon atoms, m is an integer of 1 to 10, and n is an integer of 1 to 3.

5. The polyvinyl chloride composition for powder molding according to claim 1, to be used in powder slush molding.

6. A polyvinyl chloride molded body obtained by molding a polyvinyl chloride composition for powder molding through powder slush molding,
wherein the polyvinyl chloride composition for powder molding comprises:
a polyvinyl chloride (A) having an average particle diameter of 50 to 500 μm;
a polyvinyl chloride (B) having an average particle diameter of 0.01 μm or more and less than 50 μm;
a plasticizer; and
a phosphate,
wherein an average polymerization degree of the polyvinyl chloride (A) is 1350 or more,
wherein the phosphate consists of a polyoxyalkylene alkyl phosphate, and
wherein the polyvinyl chloride composition contains the polyvinyl chloride (B) in an amount of 5 to 40 parts by mass, the plasticizer in an amount of 120 to 150 parts by mass, and the polyoxyalkylene alkyl phosphate in an amount of 0.1 to 3.0 parts by mass, with respect to 100 parts by mass of the polyvinyl chloride (A).

7. A vehicle facing material, comprising the polyvinyl chloride molded body according to claim 6.

8. A laminate obtained by laminating a polyurethane foam layer and a polyvinyl chloride molded body,
wherein the polyvinyl chloride molded body is obtained by molding a polyvinyl chloride composition for powder molding through powder slush molding,
wherein the polyvinyl chloride composition for powder molding comprises:
a polyvinyl chloride (A) having an average particle diameter of 50 to 500 μm;
a polyvinyl chloride (B) having an average particle diameter of 0.01 μm or more and less than 50 μm;
a plasticizer; and
a phosphate,
wherein an average polymerization degree of the polyvinyl chloride (A) is 1350 or more,
wherein the phosphate consists of a polyoxyalkylene alkyl phosphate, and
wherein the polyvinyl chloride composition contains the polyvinyl chloride (B) in an amount of 5 to 40 parts by mass, the plasticizer in an amount of 120 to 150 parts by mass, and the polyoxyalkylene alkyl phosphate in an amount of 0.1 to 3.0 parts by mass, with respect to 100 parts by mass of the polyvinyl chloride (A).

9. A vehicle interior material, comprising the laminate according to claim 8.

10. The polyvinyl chloride composition for powder molding according to claim 4,
wherein in general formula (1), R is an alkyl group with 4 to 16 carbon atoms, m is an integer of 2 to 10, and n is 2.

11. The polyvinyl chloride composition for powder molding according to claim 1, wherein the average polymerization degree of the polyvinyl chloride (A) is 3800 or less.

12. The polyvinyl chloride molded body according to claim 6, wherein the plasticizer comprises a trimellitic acid-based plasticizer.

13. The polyvinyl chloride molded body according to claim 6, wherein the polyoxyalkylene alkyl phosphate is a polyoxyethylene alkyl phosphate.

14. The polyvinyl chloride molded body according to claim 13,
wherein the polyoxyethylene alkyl phosphate has a structure represented by general formula (1) below:

$$[RO-(CH_2CH_2O)_m[[-O]]]_n-P(=O)(OH)_{3-n} \qquad (1)$$

where R is an alkyl group with 1 to 20 carbon atoms, m is an integer of 1 to 10, and n is an integer of 1 to 3.

15. The polyvinyl chloride molded body according to claim 14, wherein in general formula (1), R is an alkyl group with 4 to 16 carbon atoms, m is an integer of 2 to 10, and n is 2.

16. The polyvinyl chloride molded body according to claim 6, wherein the average polymerization degree of the polyvinyl chloride (A) is 3800 or less.

17. The laminate according to claim 8, wherein the plasticizer comprises a trimellitic acid-based plasticizer.

18. The laminate according to claim 8, wherein the polyoxyalkylene alkyl phosphate is a polyoxyethylene alkyl phosphate.

19. The laminate according to claim 18,
wherein the polyoxyethylene alkyl phosphate has a structure represented by general formula (1) below:

$$[RO-(CH_2CH_2O)_m[[-O]]]_n-P(=O)(OH)_{3-n} \qquad (1)$$

where R is an alkyl group with 1 to 20 carbon atoms, m is an integer of 1 to 10, and n is an integer of 1 to 3.

20. The laminate according to claim 19, wherein in general formula (1), R is an alkyl group with 4 to 16 carbon atoms, m is an integer of 2 to 10, and n is 2.

* * * * *